US010261336B2

United States Patent
Kaya

(10) Patent No.: US 10,261,336 B2
(45) Date of Patent: Apr. 16, 2019

(54) ANTI-VIBRATION OPTICAL SYSTEM, TELEPHOTO OPTICAL SYSTEM, BINOCLE, AND ANTI-VIBRATION UNIT

(71) Applicant: FUJIFILM Corporation, Tokyo (JP)

(72) Inventor: Akimasa Kaya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

(21) Appl. No.: 15/344,112

(22) Filed: Nov. 4, 2016

(65) Prior Publication Data

US 2017/0075131 A1 Mar. 16, 2017

Related U.S. Application Data

(63) Continuation of application No. PCT/JP2015/069405, filed on Jul. 6, 2015.

(30) Foreign Application Priority Data

Jul. 7, 2014 (JP) ................................. 2014-140005

(51) Int. Cl.
  *G03B 5/00* (2006.01)
  *G02B 27/64* (2006.01)
  (Continued)

(52) U.S. Cl.
  CPC ........... *G02B 27/646* (2013.01); *G02B 15/14* (2013.01); *G02B 23/02* (2013.01); *G02B 23/18* (2013.01);
  (Continued)

(58) Field of Classification Search
  CPC ...... G02B 27/646; G02B 15/14; G02B 23/02; G02B 23/18
  (Continued)

(56) References Cited

U.S. PATENT DOCUMENTS

| | | | | |
|---|---|---|---|---|
| 3,468,595 A | * | 9/1969 | Humphrey | ........... G02B 27/648 356/250 |
| 6,130,993 A | | 10/2000 | Hayakawa | |
| 2014/0368905 A1 | * | 12/2014 | Arai | ..................... G02B 17/026 359/399 |

FOREIGN PATENT DOCUMENTS

JP 10-333201 A 12/1998

OTHER PUBLICATIONS

International Search Report for PCT/JP2015/069405 (PCT/ISA/210) dated Oct. 6, 2015.
(Continued)

*Primary Examiner* — James R Greece
(74) *Attorney, Agent, or Firm* — Birch, Stewart, Kolasch & Birch, LLP

(57) ABSTRACT

The object of the present invention is to provide an anti-vibration optical system, a telephoto optical system, a binocle (binoculars), and an anti-vibration unit that are capable of appropriate distant observation even in a case where the number of reflective members is reduced.

In a telephoto optical system, an anti-vibration optical system, which is provided with a first reflective member and a second reflective member, is disposed between an objective optical system and an ocular optical system. The anti-vibration optical system corrects image blurring in a first direction (pitch direction) by rotating the first reflective member around a first rotary shaft, and corrects image blurring in a second direction (yaw direction), which is orthogonal to the first direction, by rotating the first reflective member and the second reflective member around a second optical axis.

10 Claims, 14 Drawing Sheets

(51) Int. Cl.
    *G02B 23/02*    (2006.01)
    *G02B 23/18*    (2006.01)
    *G02B 15/14*    (2006.01)
(52) U.S. Cl.
    CPC ........ *G03B 5/00* (2013.01); *G03B 2205/0007* (2013.01)
(58) Field of Classification Search
    USPC .................................................. 359/646, 683
    See application file for complete search history.

(56) References Cited

OTHER PUBLICATIONS

Written Opinion of the International Searching Authority for PCT/JP2015/069405 (PCT/ISA/237) dated Oct. 6, 2015.
Translation of Written Opinion of the International Searching Authority for PCT/JP2015/069405 (PCT/ISA/237) dated Oct. 6, 2015.

* cited by examiner

FIG. 7

ANTI-VIBRATION OPTICAL SYSTEM, TELEPHOTO OPTICAL SYSTEM, BINOCLE, AND ANTI-VIBRATION UNIT

CROSS-REFERENCE TO RELATED APPLICATION

This application is a Continuation of PCT International Application PCT/JP2015/069405 filed on 6 Jul. 2015, which claims priority under 35 USC 119 (a) from Japanese Patent Application No. 2014-140005 filed on 7 Jul. 2014. The above application is hereby expressly incorporated by reference, in its entirety, into the present application.

BACKGROUND OF THE INVENTION

1. Field of the Invention

The present invention relates to an anti-vibration optical system, a telephoto optical system, a binocle, and an anti-vibration unit capable of preventing image blurring of an optical image from occurring.

2. Description of the Related Art

Monocles each having a single telephoto optical system as an optical observation device for observing an optical image of a distant view in an enlarged manner, binoculars (binoculars) each having a pair of telephoto optical systems arranged in the left-right direction, and the like are known. Further, in order to prevent image blurring of an optical image from being caused by vibration such as hand shaking, optical observation devices each comprising an anti-vibration optical system that corrects image blurring of the optical image have been known.

Some anti-vibration optical systems of the optical observation devices may correct image blurring by driving an erecting prism provided in a telephoto optical system, or may correct image blurring by driving a plurality of reflection mirrors. The anti-vibration optical system, which drives the reflection mirrors, is characterized by having a weight lighter than and costs lower than that of the anti-vibration optical system which drives the erecting prism.

JP1998-333201A (JP-H10-333201A) describes an optical observation device in which an anti-vibration optical system having first to fourth reflective members is disposed between an objective optical system and an ocular optical system constituting a telephoto optical system. The first to fourth reflective members are formed of reflection mirrors. The anti-vibration optical system of JP1998-333201A (JP-H10-333201A) sets a second optical axis by deflecting a first optical axis of the objective optical system through a first reflective member, sets a third optical axis by deflecting the second optical axis through a second reflective member, sets a fourth optical axis by deflecting the third optical axis through the third reflective member, and sets a fifth optical axis, along which light is incident onto the ocular optical system, by deflecting the fourth optical axis through a fourth reflective member. The second reflective member and the third reflective member are formed as movable reflective members which are rotatable. With such a configuration, by separately rotating the second reflective member and the third reflective member respectively around two rotational axes orthogonal to each other, it is possible to correct image blurring in a first direction (pitch direction) and a second direction (yaw direction).

JP1999-305276A (JP-H11-305276A corresponding to U.S. Pat. No. 6,130,993) describes a photography optical system in which an anti-vibration optical system comprising a first movable mirror and a second movable mirror is disposed on the image side of a photography lens. The first movable mirror is disposed to deflect an optical axis of the photography lens upward, and the second movable mirror is disposed to deflect an optical axis of light, which is reflected by the second movable mirror, in a direction in which the optical axis becomes perpendicular to an optical axis of the photography lens and a plane including an optical axis deflected along first reflected light. A film is disposed on a focal plane of the optical axis of the light reflected by the second movable mirror. By separately rotating the first movable mirror and the second movable mirror, it is possible to correct image blurring, which is caused by movement of an imaging apparatus, on a film surface.

In the imaging apparatus or the optical observation device such as the binocle (binoculars), in order to correct image blurring of a photographed image or an observation image, the anti-vibration optical system is used. The anti-vibration optical system is built into the imaging apparatus or the observation device, and therefore it is preferable that the system has a small size and a light weight in order to secure a storage space, increase a response speed, or improve portability. However, four reflective members are necessary for the anti-vibration optical system of JP1998-333201A (JP-H10-333201A), and an optical path is also elongated by the number of reflective members. Thus, it is difficult to decrease a weight and a size thereof.

On the other hand, as in JP1999-305276A (JP-H11-305276A corresponding to U.S. Pat. No. 6,130,993), it can be considered that the system is constituted of only two movable reflective members. However, this configuration has a problem in that a direction of the optical axis of the photography lens, along which light is incident into the anti-vibration optical system, is orthogonal to a direction of an optical axis of light emitted from the anti-vibration optical system. Further, by changing directions of reflection of the two reflective members, the direction of the optical axis of light incident into the anti-vibration optical system is made to coincide with the direction of the optical axis of the emitted light. However, in a case where the two reflective members are separately rotated in this state, an optical image rotates about the optical axis. Thus, there is a problem in that appropriate observation or imaging cannot be performed.

SUMMARY OF THE INVENTION

In order to solve the above-mentioned problems, the present invention has an object to provide an anti-vibration optical system, a telephoto optical system, a binocle, and an anti-vibration unit capable of allowing appropriate observation even in a case where the number of reflective members is reduced.

In order to achieve the above-mentioned object, an anti-vibration optical system of the present invention is disposed between an objective optical system and an ocular optical system constituting a telephoto optical system so as to prevent image blurring of an optical image from being caused by vibration of the telephoto optical system. The anti-vibration optical system comprises a first reflective member and a second reflective member. The first reflective member is disposed to be inclined with respect to a first optical axis of the objective optical system and sets a second optical axis by deflecting the first optical axis. The second reflective member is disposed to be inclined with respect to the second optical axis and sets a third optical axis, which is parallel to the first optical axis, by deflecting the second optical axis. Either one of the first reflective member or the second reflective member is used as a movable reflective member which is rotatable, and image blurring in a first direction is corrected by rotating the movable reflective member. Further, image blurring in a second direction orthogonal to the first direction is corrected by integrally rotating the first reflective member and the second reflective member.

It is preferable that a first rotary shaft, around which the movable reflective member is rotated in order to correct image blurring in the first direction, is a shaft that passes through an intersection between the second optical axis and a reflective surface of the movable reflective member and that is perpendicular to a plane formed by the first optical axis and the second optical axis.

It is preferable that a second rotary shaft, around which the first reflective member and the second reflective member are integrally rotated in order to correct image blurring in the second direction, is on the second optical axis.

It is preferable that the anti-vibration optical system further comprises a barrel that rotatably holds one reflective member of either the first reflective member or the second reflective member, which is used as the movable reflective member, so as to be able to correct image blurring in the first direction, and that holds the other reflective member in a stationary state.

It is preferable that the barrel is held rotatably so as to be able to correct image blurring in the second direction.

It is preferable that an angle formed between the first optical axis and the second optical axis is a right angle.

Further, a telephoto optical system of the present invention comprises an objective optical system and an ocular optical system. The objective optical system has a positive composite focal length. The anti-vibration optical system is provided between the objective optical system and the ocular optical system. Further, in the ocular optical system constituting the telephoto optical system, it is preferable that the ocular optical system has a positive composite focal length, and an erecting optical system, which inverts an optical image in vertical and horizontal directions, is provided between the anti-vibration optical system and the ocular optical system.

Furthermore, a binocle of the present invention is capable of allowing binocular vision through a left telephoto optical system and a right telephoto optical system as a pair of telephoto optical systems which are arranged on the left and right sides thereof such that the first optical axes thereof are parallel to each other. The left telephoto optical system and the right telephoto optical system are respectively provided with anti-vibration optical systems which are separate. Further, it is preferable that the anti-vibration optical system of the left telephoto optical system and the anti-vibration optical system of the right telephoto optical system are connected through a link mechanism such that an amount of rotation for correcting image blurring in the first direction is equal to an amount of rotation for correcting image blurring in the second direction.

In addition, an anti-vibration unit of the present invention prevents image blurring of an optical image from occurring. The anti-vibration unit comprises a first reflective member, a second reflective member, and a holding member. The first reflective member is disposed to be inclined with respect to a first optical axis and sets a second optical axis by deflecting the first optical axis. The second reflective member is disposed to be inclined with respect to the second optical axis and sets a third optical axis, which is parallel to the first optical axis, by deflecting the second optical axis. The holding member is disposed to be rotatable around the second optical axis while holding the first reflective member and the second reflective member. The holding member holds one of the first reflective member and the second reflective member in a stationary state, and holds the other thereof rotatably around an axis perpendicular to a plane formed by the first optical axis and the second optical axis.

According to the present invention, compared with the anti-vibration optical system formed of a reflective member used in the related art, it is possible to reduce the number of reflective members. Therefore, it is possible to achieve reduction in size and weight and low costs for the anti-vibration optical system and the telephoto optical system, the binocle (binoculars), and the anti-vibration unit using the anti-vibration optical system. Further, even in a case where the number of reflective members is reduced, an optical image is prevented from rotating. Thus, it is possible to appropriately perform observation of a distant view.

BRIEF DESCRIPTION OF THE DRAWINGS

FIG. 7 is an exploded perspective view of a link mechanism.

DESCRIPTION OF THE PREFERRED EMBODIMENTS

First Embodiment

Figure 1:
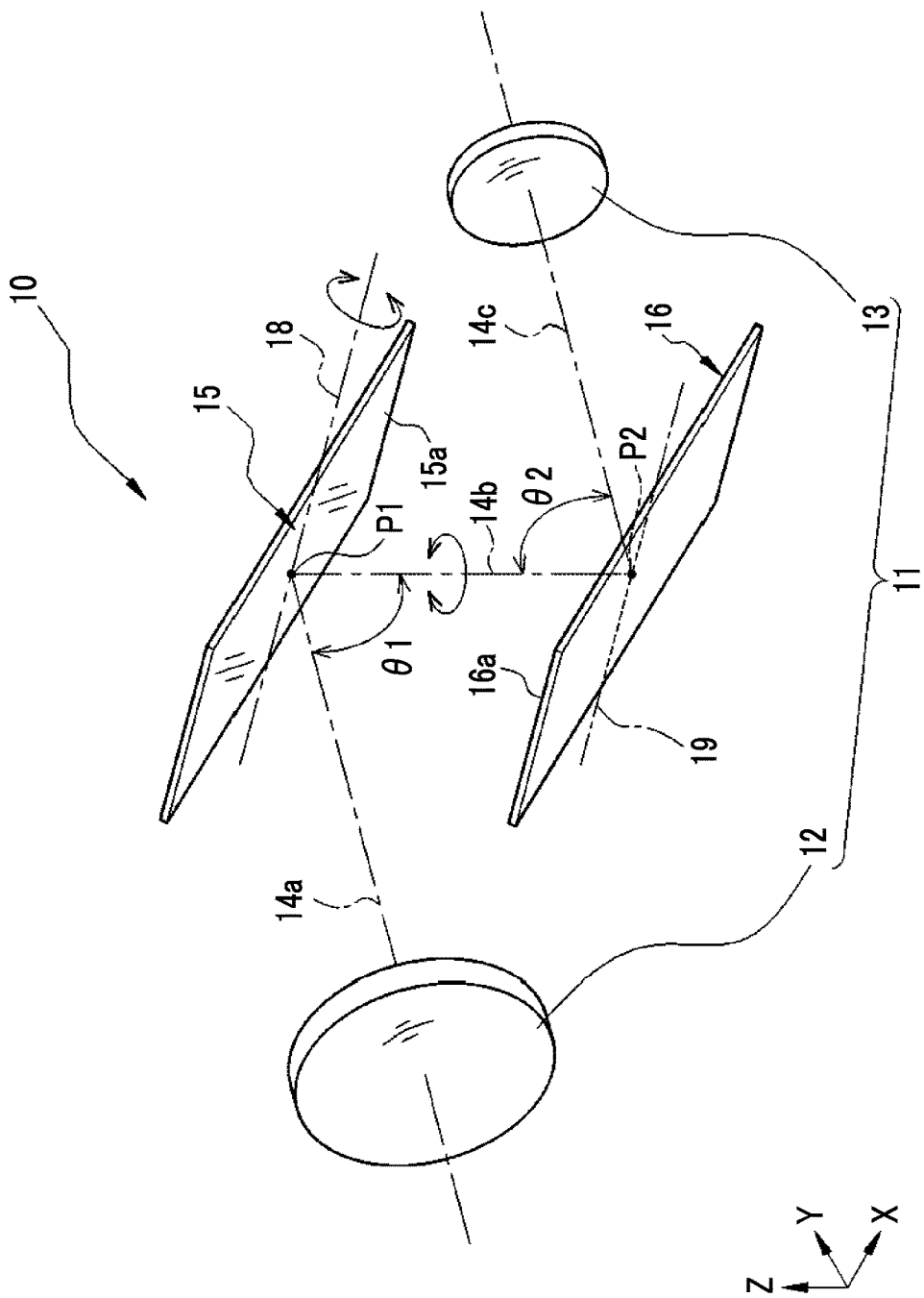
FIG. 1 is an overall diagram illustrating an anti-vibration optical system.

As shown in FIG. 1, an anti-vibration optical system 10 of the present embodiment is disposed between an objective optical system 12 and an ocular optical system 13 constituting a telephoto optical system 11, and corrects image blurring, which is caused by vibration of an optical observation device provided with the telephoto optical system 11, on an optical image of the telephoto optical system 21.

The anti-vibration optical system 10 comprises a first reflective member 15 and a second reflective member 16. The first reflective member 15 is disposed to be inclined with respect to a first optical axis 14a of the objective optical system 12 and sets a second optical axis 14b by deflecting the first optical axis 14a. The second reflective member 16 is disposed to be inclined with respect to the second optical axis 14b and sets a third optical axis 14c, which is parallel to the first optical axis 14a, by deflecting the second optical axis 14b. In each of the first reflective member 15 and the second reflective member 16, a surface-reflection-type reflection mirror is used. For example, in a case where a reflective surface 15a of the first reflective member 15 is disposed at an angle of 45° with respect to the first optical axis 14a, an angle θ1, which is formed between the first optical axis 14a and the second optical axis 14b, and an angle θ2, which is formed between the second optical axis 14b and the third optical axis 14c, each are a right angle (90°).

Either one of the first reflective member 15 or the second reflective member 16 is used as a movable reflective member which is rotatable. The movable reflective member is, for example, the first reflective member 15. By rotating the movable reflective member in accordance with an amount of vibration of the optical observation device in a first direction, a direction of vibration in the third optical axis is changed. Therefore, it is possible to correct image blurring in the first direction. Further, the first reflective member 15 and the second reflective member 16 can be integrally rotated. By integrally rotating the first reflective member 15 and the second reflective member 16 in accordance with an amount of vibration of the optical observation device in a second direction, a direction of vibration in the third optical axis is changed. Therefore, it is possible to correct image blurring in the second direction orthogonal to the first direction.

In order to correct image blurring in the first direction, a first rotary shaft, around which the movable reflective member rotates, is set to be perpendicular to a plane which passes through an intersection between the second optical axis and a reflective surface of the movable reflective member and which is formed by the first optical axis and the second optical axis. For example, in a case where the first reflective member 15 is a movable reflective member, the first rotary shaft is a rotational axis 18 that passes through an intersection P1 between the second optical axis 14b and the reflective surface 15a of the first reflective member 15, and that is perpendicular to a plane formed by the first optical axis 14a and the second optical axis 14b. Likewise, in a case where the second reflective member 16 is a movable reflective member, the first rotary shaft is a rotational axis 19 that passes through an intersection P2 between the second optical axis 14b and the reflective surface 16a of the second reflective member 16, and that is perpendicular to a plane formed by the first optical axis 14a and the second optical axis 14b. Consequently, a bias direction of the third optical axis 14c is changed with respect to the rotational axis 18 or the rotational axis 19 as a center through rotation of the first reflective member 15 or the second reflective member 16. Therefore, as image blurring in the first direction, so-called image blurring in a pitch direction is corrected.

Further, the second rotary shaft, around which the first reflective member 15 and the second reflective member 16 are integrally rotated, is on, for example, the second optical axis 14b. Accordingly, by integrally rotating the first reflective member 15 and the second reflective member 16, the bias direction of the third optical axis 14c is changed with respect to the second optical axis 14b as a center. Therefore, as imaging blurring in the second direction, so-called image blurring in a yaw direction is corrected.

In a case where mixed image blurring in the first direction and the second direction is corrected, the first reflective member 15 and the second reflective member 16 are integrally rotated around the second rotary shaft while the first reflective member 15 is rotated around the first rotary shaft. Even in such a case where mixed image blurring is corrected, the first reflective member 15 and the second reflective member 16 are integrally rotated. Therefore, an optical image is prevented from rotating around the optical axis.

As described above, the anti-vibration optical system 10 of the present embodiment is formed of two reflective members of the first reflective member 15 and the second reflective member 16. Hence, compared with an anti-vibration optical system used in the related art, the number of reflective members is reduced. As a result, this contributes to reduction in sizes, weights, and costs. Further, in a case where either one of the first reflective member 15 or the second reflective member 16 as the movable reflective member corrects image blurring in the first direction and corrects image blurring in the second direction orthogonal to the first direction, the first reflective member 15 and the second reflective member 16 are integrally rotated.

Consequently, even in a case where mixed image blurring in the first direction and the second direction is corrected, an optical image is prevented from rotating around the optical axis.

Second Embodiment

Figure 2:
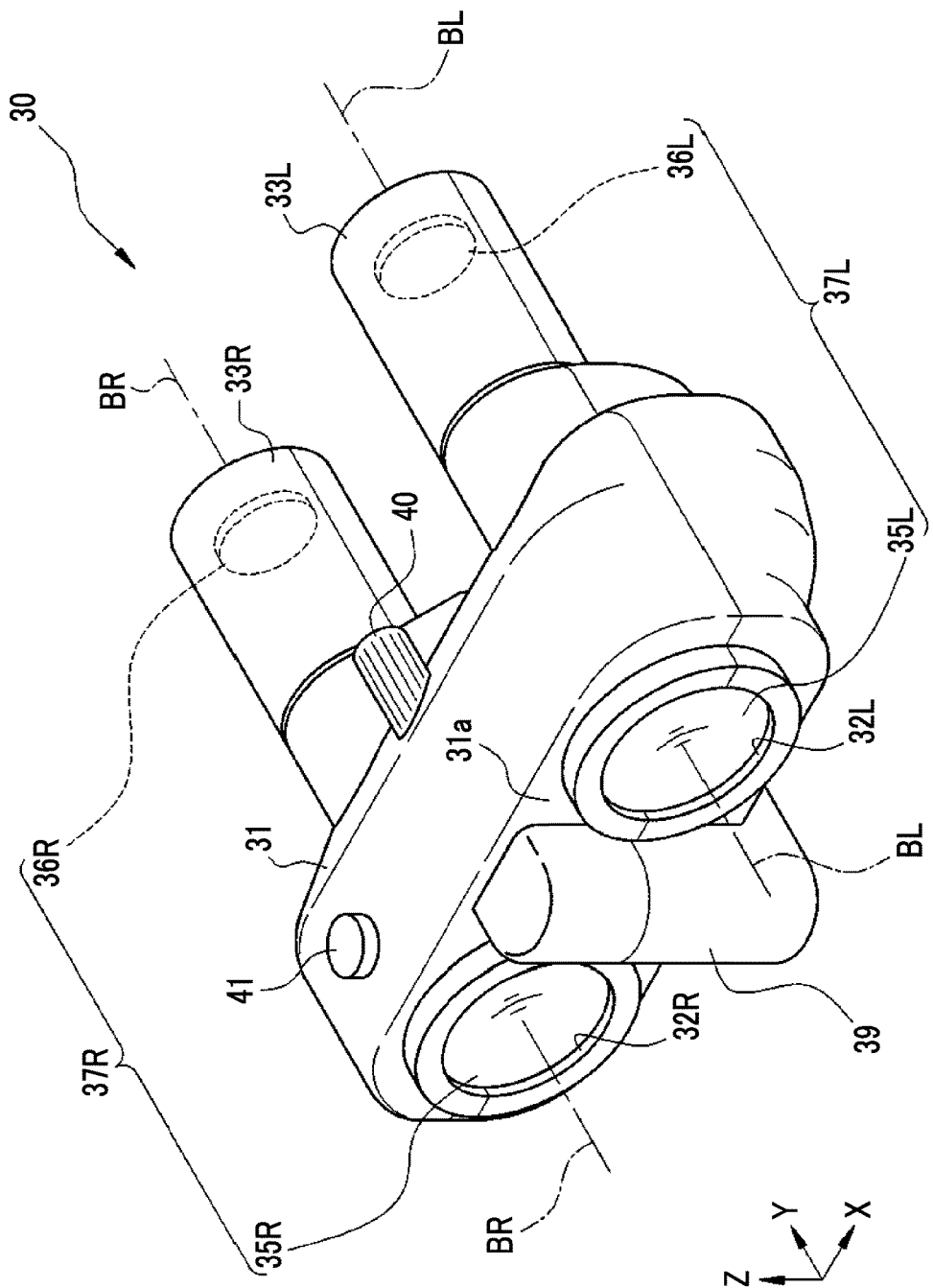
FIG. 2 is a perspective view illustrating an appearance of a binocle (binoculars).

In FIG. 2, a binocle 30 (binoculars) of the present embodiment is an optical observation device that is used to observe an optical image of a distant view in an enlarged manner through a pair of a left telephoto optical system and a right telephoto optical system which are formed of the telephoto optical systems of the first embodiment. The left telephoto optical system and the right telephoto optical system of the binocle 30 are provided with an anti-vibration optical system which is the same as the anti-vibration optical system 10 described in the first embodiment. Assuming that a front-back direction of the binocle 30 is a Y axis, a width direction orthogonal to the front-back direction is an X axis, and an axis perpendicular to the Y axis and the X axis is a Z axis, the anti-vibration optical system corrects image blurring in the pitch direction (the first direction) around the X axis and image blurring in the yaw direction (the second direction orthogonal to the first direction) around the Z axis.

The binocle 30 comprises: a main body portion 31 in which a pair of a left objective opening 32L and a right objective opening 32R is provided on a front surface 31a; and a pair of a left eyepiece portion 33L and a right eyepiece portion 33R that is provided on the rear side of the main body portion 31. Through the binocle 30, an enlarged image of an observation target can be observed by orienting the left objective opening 32L and the right objective opening 32R toward the observation target and viewing the observation target through the left eyepiece portion 33L and the right eyepiece portion 33R with both eyes in a state where the main body portion 31 is gripped.

Inside the left objective opening 32L and the right objective opening 32R, the left objective optical system 35L and the right objective optical system 35R are provided. Inside the left eyepiece portion 33L and the right eyepiece portion 33R, a left ocular optical system 36L and a right ocular optical system 36R are provided. The left objective optical system 35L, the right objective optical system 35R, the left ocular optical system 36L, and the right ocular optical system 36R each are formed of a lens having a positive composite focal length.

The left objective optical system 35L and the left ocular optical system 36L are disposed on a left-eye optical axis BL which is set along the front-back direction (Y axis direction) of the binocle 30, and constitute a left telephoto optical system 37L. Further, the right objective optical system 35R and the right ocular optical system 36R are disposed on a right-eye optical axis BR which is set in parallel to the left-eye optical axis BL in the width direction (X axis direction) orthogonal to the front-back direction of the binocle 30, and constitute a right telephoto optical system 37R.

A battery housing portion 39 is provided on the front surface 31a of the main body portion 31, between the left objective opening 32L and the right objective opening 32R. The battery housing portion 39 houses a battery 42 (refer to FIG. 4) that serves as a power supply of an anti-vibration control circuit 86 (refer to FIG. 15) to be described later. Further, an adjusting knob 40, which is rotated for the situation where focus adjustment is performed, is provided on the upper portion on the rear side of the main body portion 31. A push-button-type power switch 41 is provided on the right side of an upper surface of the main body portion 31. In the event that the power switch 41 is pressed, the anti-vibration control circuit 86 is operated.

Figure 3:
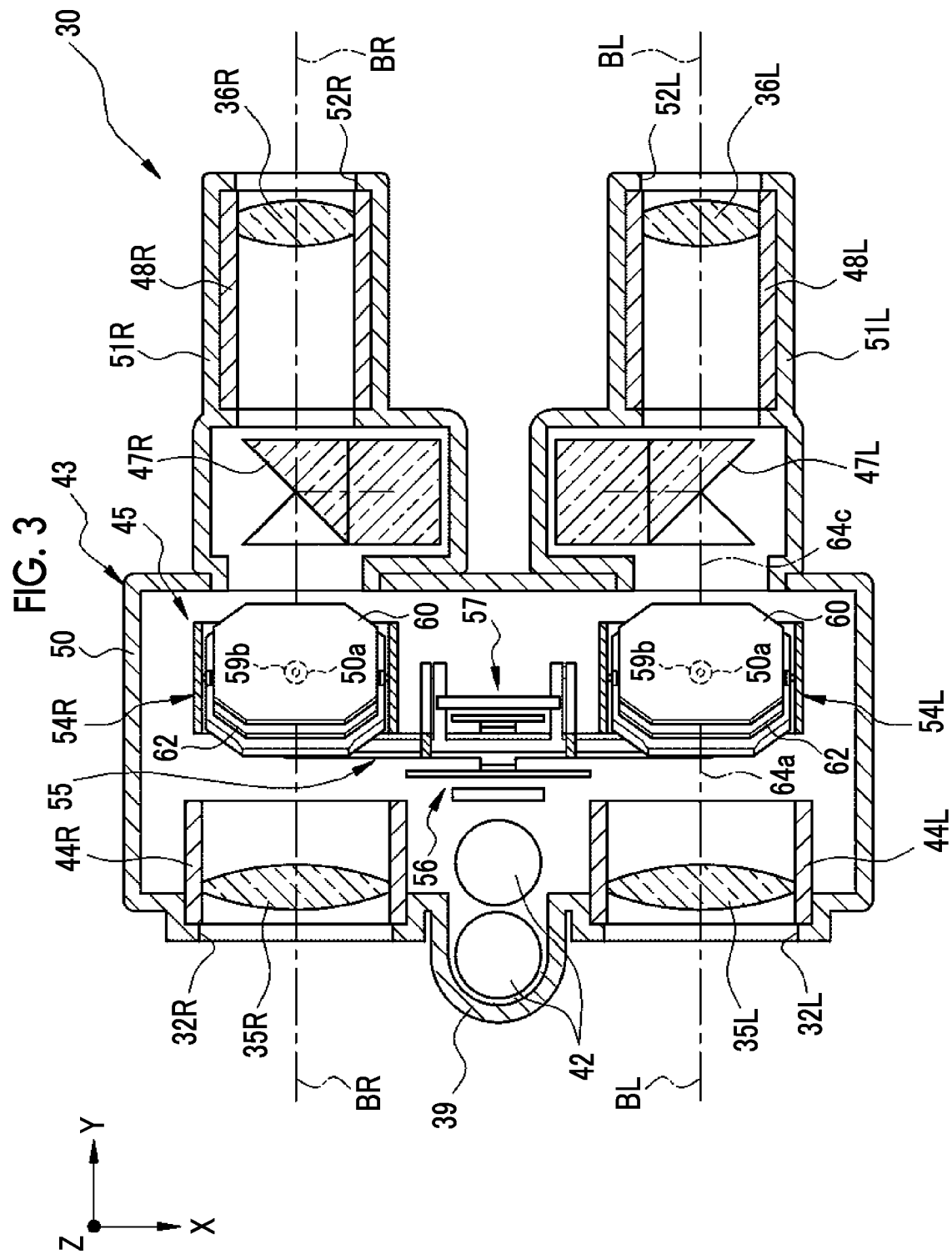
FIG. 3 is a horizontal cross-section view of a binocle.
Figure 4:
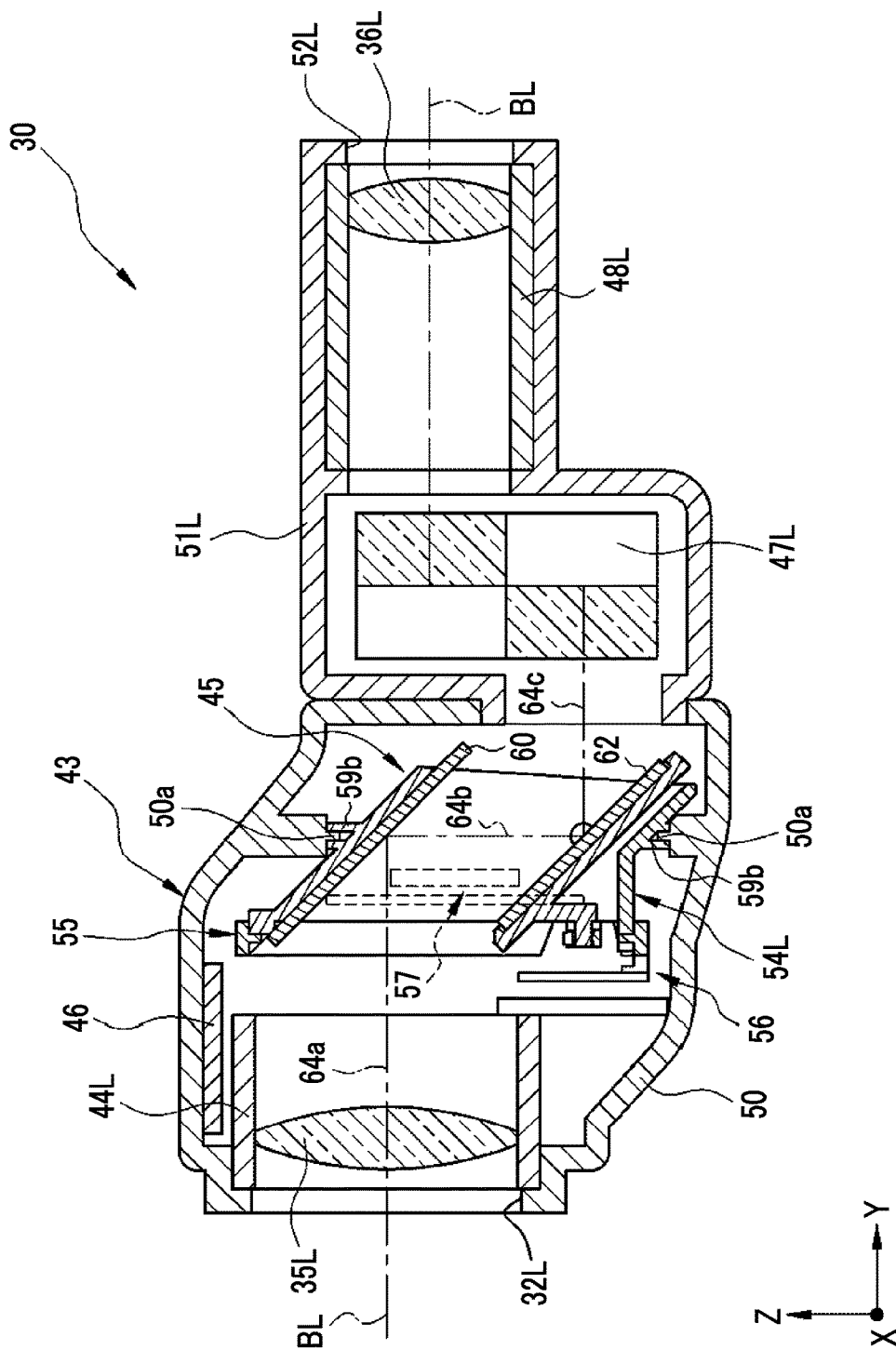
FIG. 4 is a vertical cross-section view taken along an optical axis of the binocle for the left eye.

FIGS. 3 and 4 show a horizontal cross-section of the binocle 30, and a vertical cross-section taken along the left-eye optical axis BL. As shown in FIGS. 3 and 4, the binocle 30 comprises a casing 43, a left objective barrel 44L, a right objective barrel 44R, an anti-vibration mechanism 45, a control substrate 46, a left erecting optical system 47L, a right erecting optical system 47R, a left eyepiece barrel 48L, and a right eyepiece barrel 48R. The anti-vibration mechanism 45 including the anti-vibration optical system, the left erecting optical system 47L, and the right erecting optical system 47R constitute the left telephoto optical system 37L and the right telephoto optical system 37R.

The casing 43 comprises a casing main body 50, a left eyepiece casing 51L, and a right eyepiece casing 51R. The casing main body 50 is an exterior of the main body portion 31. The left eyepiece casing 51L is an exterior of the left eyepiece portion 33L. The right eyepiece casing 51R is an exterior of the right eyepiece portion 33R. The main body casing 53 houses the left objective barrel 44L, the right objective barrel 44R, the anti-vibration mechanism 45, and the control substrate 46. The left eyepiece casing 51L houses the left erecting optical system 47L and the left eyepiece barrel 48L. Further, the right eyepiece casing 51R houses the right erecting optical system 47R and the right eyepiece barrel 48R.

In the left eyepiece casing 51L and the right eyepiece casing 51R, the left eyepiece opening 52L and the right eyepiece opening 52R are respectively provided to expose the left ocular optical system 36L and the right ocular optical system 36R to the outside. Further, the left eyepiece casing 51L and the right eyepiece casing 51R are fit into the casing main body 50 so as to be rotatable respectively around the left-eye optical axis BL and the right-eye optical axis BR in order to be able to adjust spacing between the left eyepiece portion 33L and the right eyepiece portion 33R in accordance with spacing between both eyes of a binocle user.

The left objective barrel 44L and the right objective barrel 44R have cylinder shapes, and the left objective optical system 35L and the right objective optical system 35R are respectively housed therein. The left objective barrel 44L and the right objective barrel 44R are held rotatably in the optical axis direction through a holding mechanism which is not shown. The holding mechanism moves the left objective barrel 44L and the right objective barrel 44R in the optical axis direction through a rotation operation of the adjusting knob 40.

Figure 5:
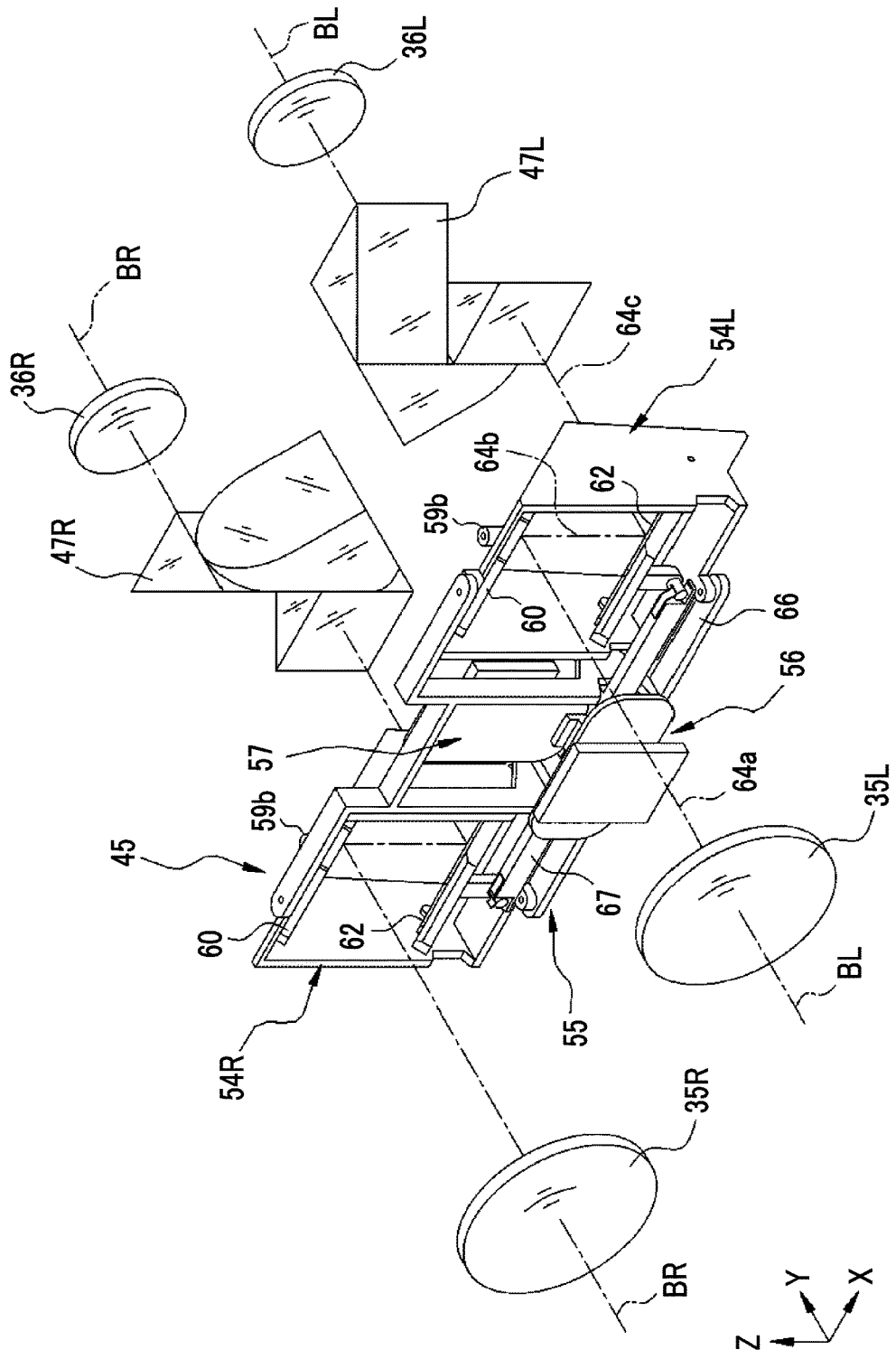
FIG. 5 is a perspective view illustrating a configuration of an anti-vibration mechanism.

The anti-vibration mechanism 45 is a mechanism for correcting image blurring, which is caused by hand shaking and the like, on an optical image. As shown in FIG. 5, the anti-vibration mechanism 45 comprises a left anti-vibration unit 54L, a right anti-vibration unit 54R, a link mechanism 55, a first actuator 56, and a second actuator 57.

The left anti-vibration unit 54L is a mechanism for correcting image blurring in the left telephoto optical system 37L. The left anti-vibration unit 54L is disposed between the left objective optical system 35L and the left ocular optical system 36L, and constitutes a part of the left telephoto optical system 37L. Further, the right anti-vibration unit 54R is a mechanism for correcting image blurring in the right telephoto optical system 37R. The right anti-vibration unit 54R is disposed between the right objective optical system 35R and the right ocular optical system 36R, and constitutes a part of the right telephoto optical system 37R.

The link mechanism 55 is a mechanism that links the left anti-vibration unit 54L and the right anti-vibration unit 54R with each other and that causes the left anti-vibration unit 54L and the right anti-vibration unit 54R to perform the same operations at the time of image blur correction. The first actuator 56 and the second actuator 57 are disposed between the left anti-vibration unit 54L and the right anti-vibration unit 54R, and operate the left anti-vibration unit 54L and the right anti-vibration unit 54R by driving the link mechanism 55. By using the link mechanism 55, it is possible to simplify control of an actuator, and it is possible to reduce a size and costs thereof.

The left erecting optical system 47L and the right erecting optical system 47R are optical systems that invert the optical image, in which image blurring is corrected through the anti-vibration mechanism 45, in the vertical and horizontal directions, and that causes light to be incident into the left ocular optical system 36L and the right ocular optical system 36R. In each of the left erecting optical system 47L and the right erecting optical system 47R, an erecting prism such as a Porro prism or a roof prism is used.

The left eyepiece barrel 48L and the right eyepiece barrel 48R have cylinder shapes, and the left ocular optical system 36L and the right ocular optical system 36R are respectively housed therein. In addition, for the sake of simplicity of drawings, the left objective optical system 35L, the right objective optical system 35R, the left ocular optical system 36L, and the right ocular optical system 36R each are shown as a single lens, but may be formed of a plurality of lenses.

Figure 6:
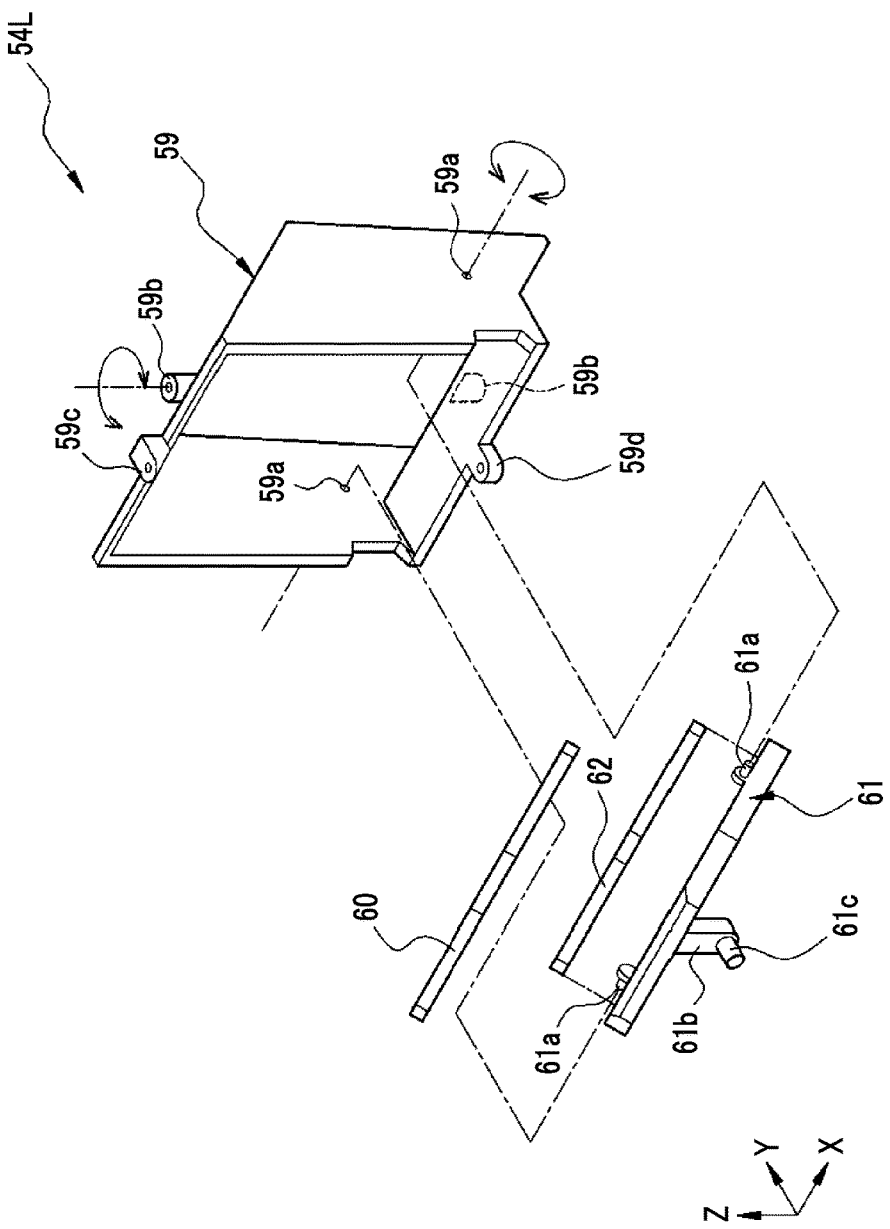
FIG. 6 is an exploded perspective view of a left anti-vibration unit including the anti-vibration optical system.

As shown in FIG. 6, the left anti-vibration unit 54L comprises a barrel 59, a first reflective member 60, a holding plate 61, and a second reflective member 62. The barrel 59 has a box shape of which the front side and the rear side are opened. The first reflective member 60 is fixed in the barrel 59. The holding plate 61 is rotatably supported in the barrel 59. The second reflective member 62 is fixed onto the upper surface of the holding plate 61. In each of the first reflective member 60 and the second reflective member 62, for example, a surface-reflection-type reflection mirror is used. It should be noted that the barrel 59 and the holding plate 61 correspond to the holding member of the present invention.

The first reflective member 60 is inserted in the barrel 59, and is fixed onto an upper surface of an inner wall of the barrel 59 through an adhesive or the like such that a reflective surface thereof is oriented downward. As shown in FIG. 4, the upper surface of the inner wall of the barrel 59 viewed from the X axis direction is inclined at an angle of 45° with respect to a first optical axis 64a which is an optical axis of the left objective optical system 35L. Accordingly, the first reflective member 60 is also held at an angle of 45° with respect to a first optical axis 64a.

The holding plate 61 is a rectangular-plate-like member. The second reflective member 62 is fixed onto an upper surface of the holding plate 61 through an adhesive or the like such that the reflective surface thereof is oriented upward. A pair of rotation pins 61a is provided on both side surfaces of the holding plate 61. The pair of rotation pins 61a is inserted into a pair of bearing holes 59a which are provided on both side surfaces of the barrel 59 in a case where the holding plate 61 is inserted into the barrel 59. Thereby, the holding plate 61 and the second reflective member 62 are rotatably supported in the barrel 59.

An arm 61b, which protrudes downward, is provided on a lower surface of the holding plate 61. A connecting pin 61c, which protrudes in the Y axis direction so as to be connected to the link mechanism 55, is provided on a distal end of the arm 61b. The holding plate 61 is rotated by the link mechanism 55 with the connecting pin 61c interposed therebetween. In addition, in a state where vibration does not occur on the binocle 30 (binoculars), an angle of the holding plate 61 is maintained by the link mechanism 55 such that the second reflective member 62 is parallel to the first reflective member 60.

A pair of bearing bosses 59b, which are rotatably supported by a pair of bearing pins 50a erected on the upper and lower surfaces of the inner wall of the casing main body 50, is provided on the same Z axis of the upper surface and the lower surface of the barrel 59. Thereby, the first reflective member 60 and second reflective member 62 held by the barrel 59 are integrally rotatable around the Z axis. Further, a pair of upper connection boss 59c and lower connection boss 59d, which are used for connection with the link mechanism 55, is provided on the same Z axis on upper and lower portions of the front side of the barrel 59.

The first reflective member 60 and the second reflective member 62 correspond to the anti-vibration optical system of the present invention. The second reflective member 62 corresponds to the movable reflective member of the present invention. The first reflective member 60 deflects the first optical axis 64a of the left objective optical system 35L through reflection, and thereby sets a second optical axis 64b which is at a right angle with respect to the first optical axis 64a. The second reflective member 62 deflects the second optical axis 64b through reflection, and thereby sets a third optical axis 64c which is parallel to the first optical axis 64a.

Each rotation pin 61a of the holding plate 61 is on an axis that passes through an intersection between the second optical axis 64b and a reflective surface of the second reflective member 62 and is perpendicular to a plane formed by the first optical axis 64a and the second optical axis 64b. Hence, the rotation pins 61a correspond to the first rotary shaft. Consequently, by rotating the second reflective member 62 around the rotation pins 61a, a bias direction of the third optical axis 64c is changed. As a result, it is possible to correct image blurring in the first direction (pitch direction).

The bearing bosses 59b of the barrel 59 is provided on the second optical axis 64b, and correspond to the second rotary shaft. Accordingly, by integrally rotating the first reflective member 60 and the second reflective member 62 around the bearing bosses 59b, the bias direction of the third optical axis 64c is changed. As a result, it is possible to correct image blurring in the second direction (yaw direction) which is orthogonal to the first direction.

In addition, the right anti-vibration unit 54R has the same configuration as the left anti-vibration unit 54L, and is supported by the casing main body 50 so as to be rotatable around the Z axis in a manner similar to that of the left anti-vibration unit 54L. Further, the right anti-vibration unit 54R is connected to the link mechanism 55, with the same structure as the left anti-vibration unit 54L. Accordingly, a detailed description of the right anti-vibration unit 54R will be omitted.

Figure 7:
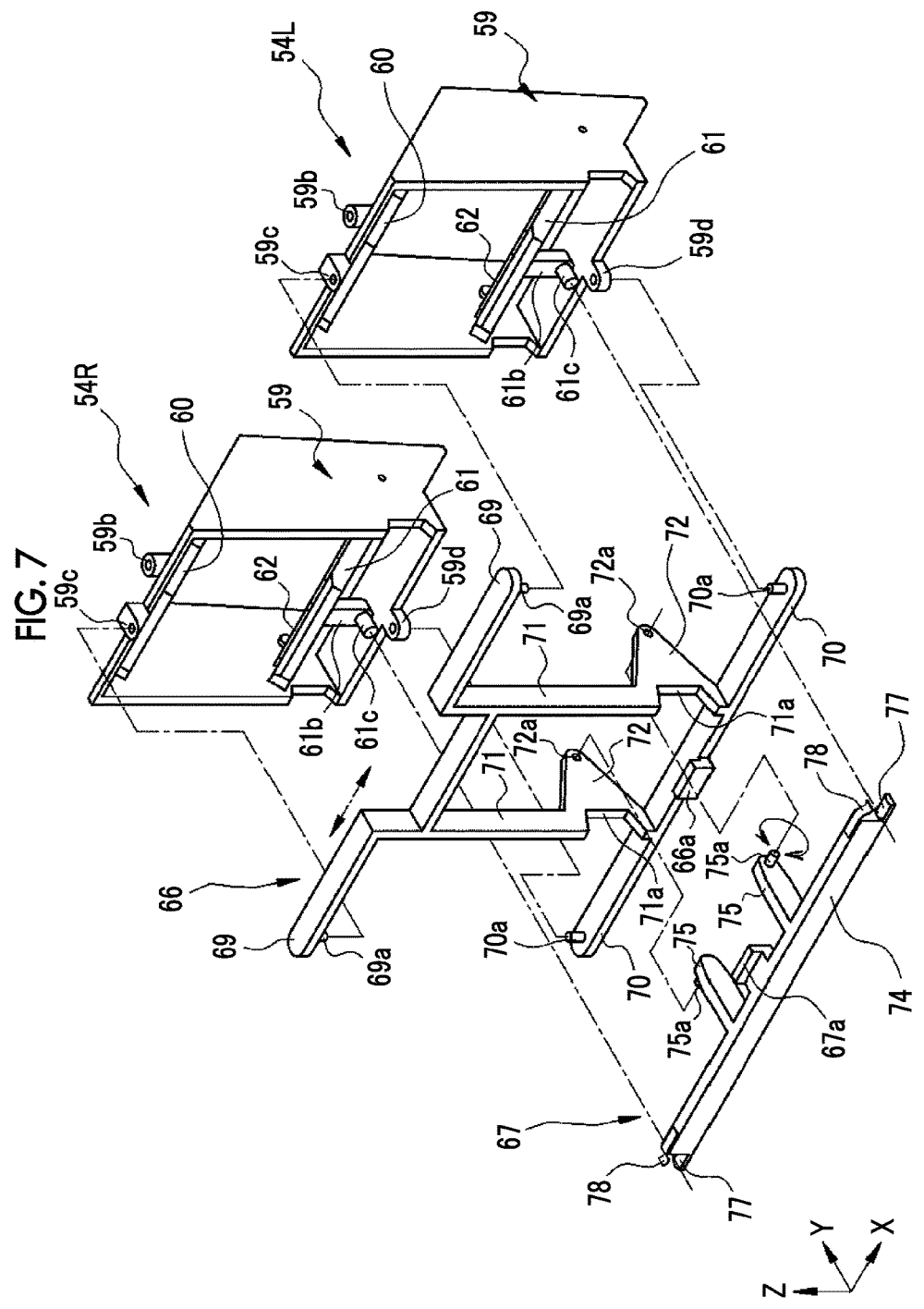

As shown in FIG. 7, the link mechanism 55 comprises a first link member 66 and a second link member 67. The first link member 66 links the barrels 59 of the left anti-vibration unit 54L and the right anti-vibration unit 54R with each other. The first link member 66 links with the barrels 59, and is thereby supported to be rotatable around the X axis direction. The second link member 67 links the second reflective members 62 of the left anti-vibration unit 54L and the right anti-vibration unit 54R with each other. The second link member 67 is rotatably supported by the first link member 66.

The first link member 66 comprises first arms 69, second arms 70, a pair of connecting portions 71. A pair of left and right connecting pins 69a, which are inserted into the upper connection bosses 59c of the barrels 59, is provided on lower surfaces of the first arms 69. A pair of connecting pins 70a, which are inserted into the lower connection bosses 59d of the barrels 59, on the left and right sides is provided on upper surfaces of the second arms 70. The pair of connecting portions 71 is vertically disposed such that the first arms 69 and the second arms 70 are integrally formed. Each of a pair of left and right third arms 72, which protrude toward an interval between the barrels 59 along the Y axis direction, is provided in each of the pair of connecting portions 71. Connection holes 72a are respectively provided in the third arms 72 on the same X axis. Further, in the pair of connecting portions 71, notches 71a, which are for avoiding interference between the second link member 67 and the pair of connecting portions 71, are respectively provided on a side opposite to a side on which the third arms 72 are provided.

The second link member 67 comprises a main body arm 74 and a pair of left and right connecting arms 75. The main body arm 74 is provided along the X axis direction. The pair of left and right connecting arms 75 protrudes from the main body arm 74 toward the interval between the barrels 59 along the Y axis direction. Connecting pins 75a, which are inserted into connection holes 72a provided on the third arms 72 of the first link member 66, are respectively provided on the side surfaces of the connecting arms 75. The second link member 67 links the third arms 72 with the connecting arms 75, and is supported by the first link member 66 so as to be rotatable around the axis of the connecting pins 75a.

Figure 8:
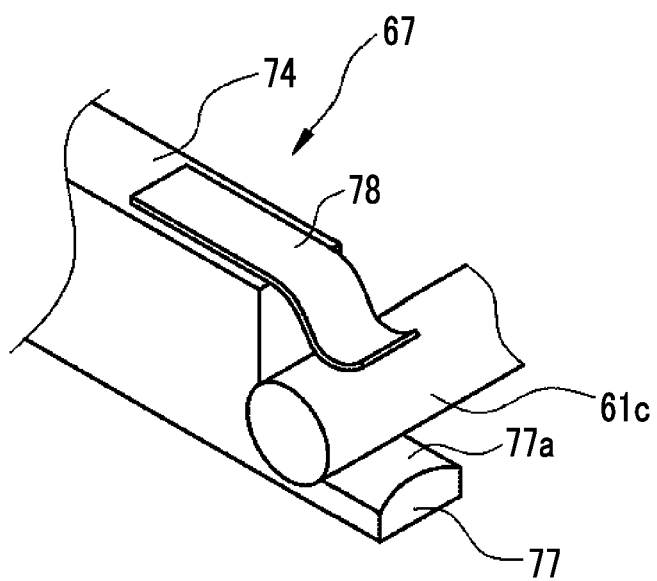
FIG. 8 is a perspective view illustrating a shape of an end portion of a second link member.

Contact portions 77, which are abutted against the connecting pins 61c of the holding plate 61 from the lower side, are respectively provided on both ends of the main body arm 74. As shown in FIG. 8, contact surfaces 77a of the contact portions 77 are formed in an arc shape in order not to cause change in a state where the contact portions 77 are abutted against the connecting pins 61c due to rotation of the second link member 67. A pair of urging members 78, which urge the connecting pins 61c of the holding plate 61 such that the connecting pins 61c are abutted against the contact portions 77, is mounted on both ends of the main body arm 74. As the urging members 78, for example, leaf springs formed of metal plates are used.

Figure 9:
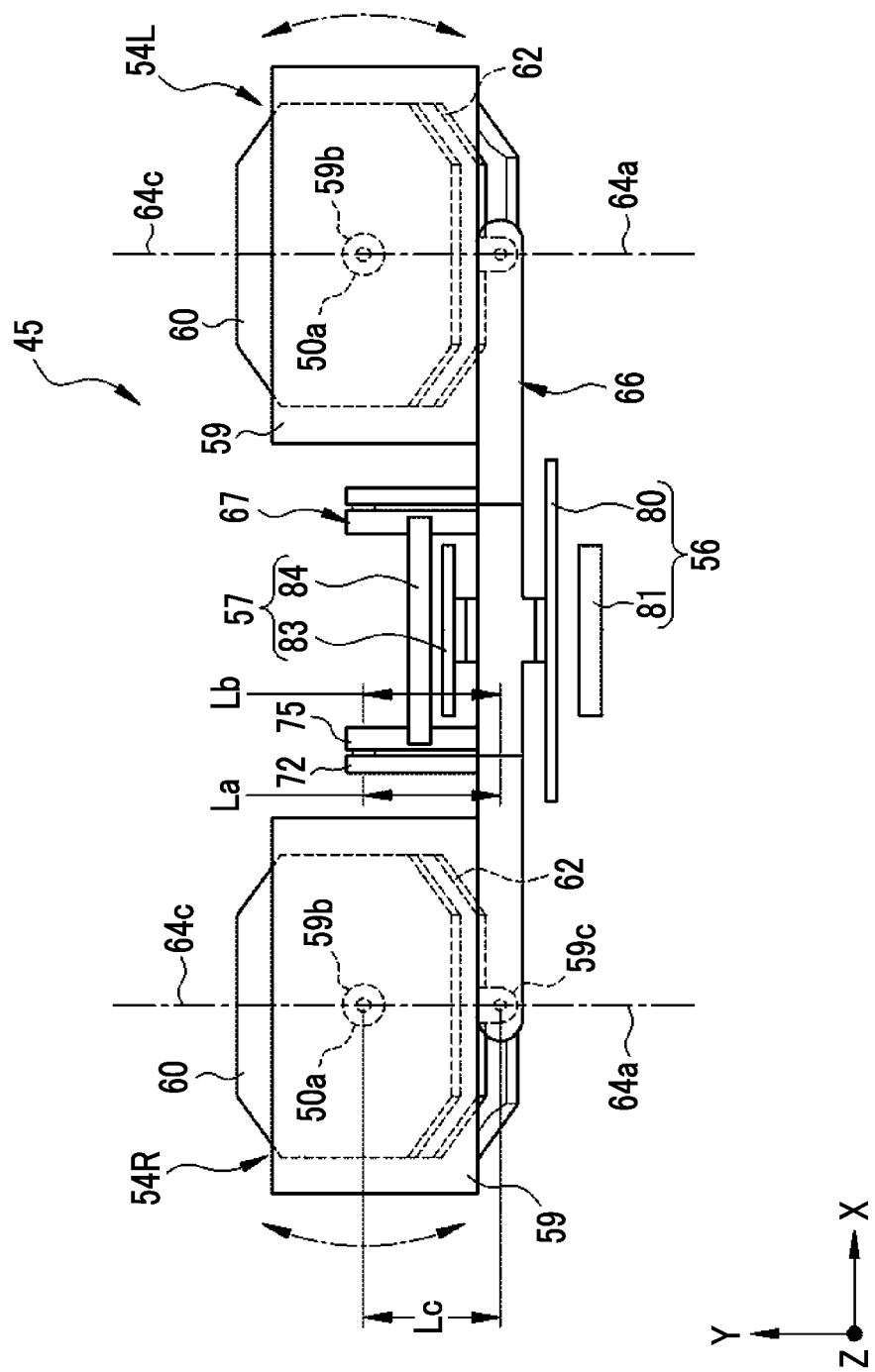
FIG. 9 is a plan view of the anti-vibration mechanism.
Figure 10:
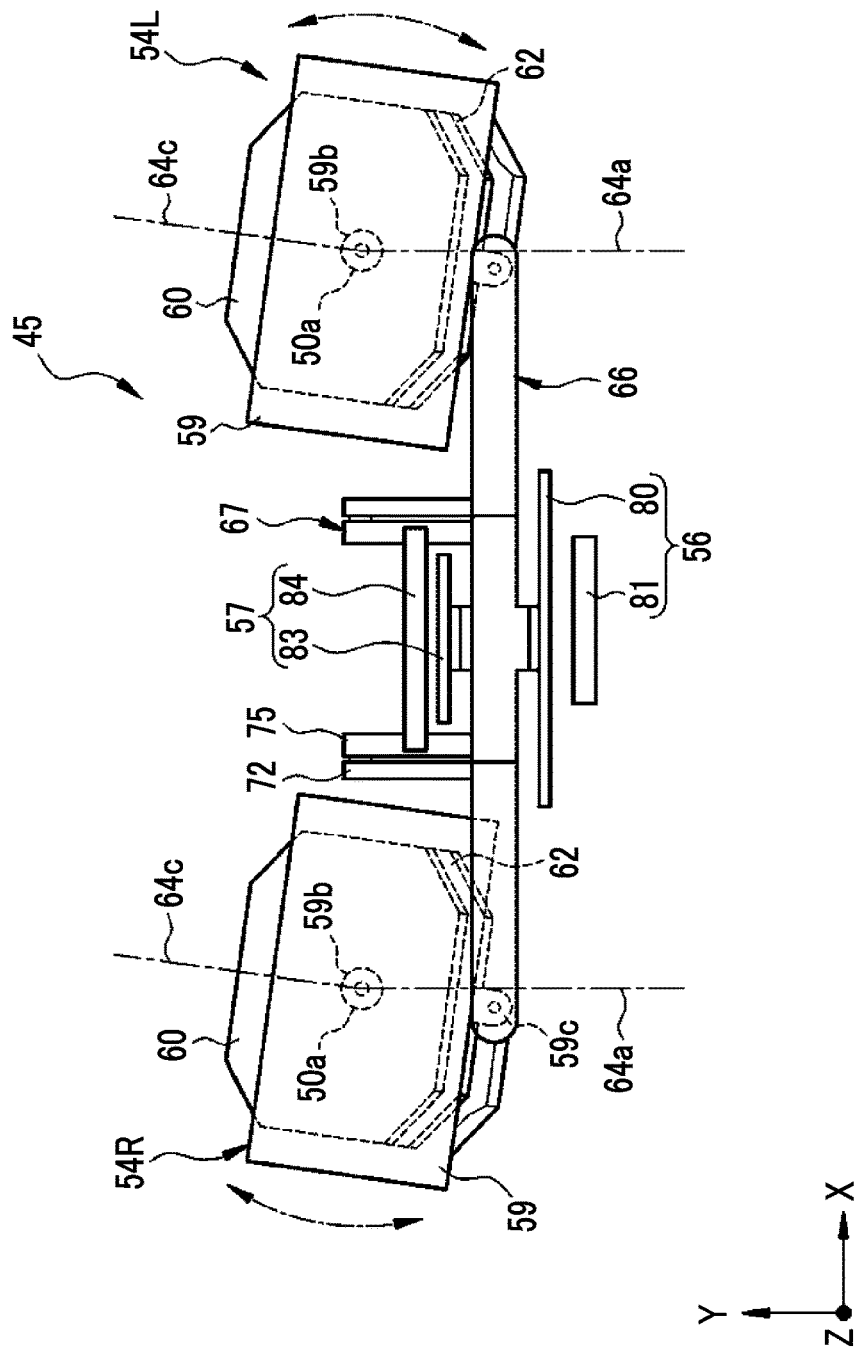
FIG. 10 is a plan view of the anti-vibration mechanism at the time of blur correction.
Figure 11:
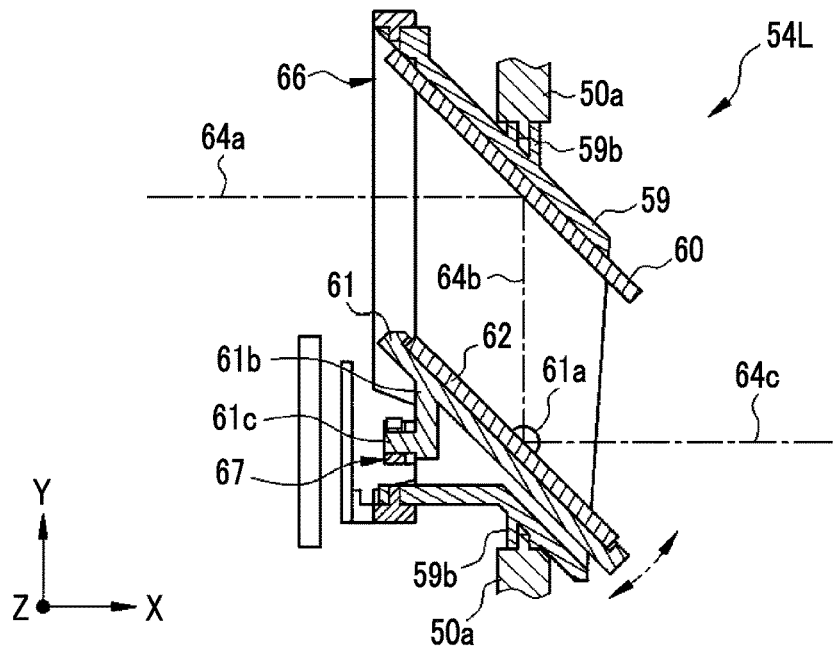
FIG. 11 is a vertical cross-section view taken along an optical axis of the anti-vibration mechanism for the left eye.
Figure 12:
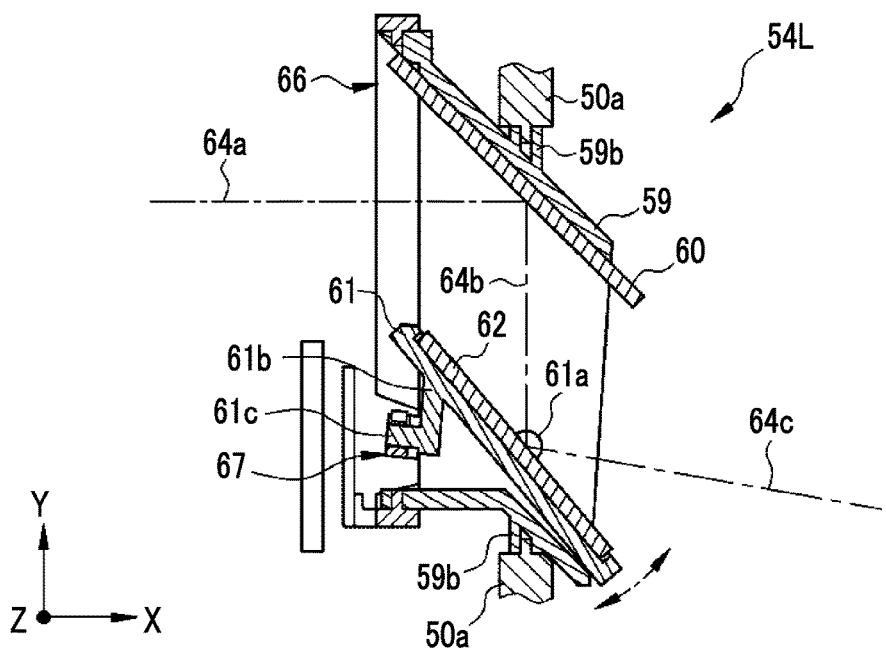
FIG. 12 is a vertical cross-section view taken along an optical axis of the anti-vibration mechanism for the left eye at the time of blur correction.

As shown in FIGS. 9 and 10, the link mechanism 55 rotates the left anti-vibration unit 54L and the right anti-vibration unit 54R around the Z axes centered on the bearing bosses 59b by moving the first link member 66 along the X axis direction. Thereby, the first reflective member 60 and the second reflective member 62 of the left anti-vibration unit 54L and the right anti-vibration unit 54R are respectively integrally rotated, and therefore a bias direction of the third optical axis 64c is changed. As a result, image blurring in the second direction (yaw direction) is corrected. Further, as shown in FIGS. 11 and 12, in a case where the second link member 67 was rotated around the connecting pins 75a, the second reflective members 62 of the left anti-vibration unit 54L and the right anti-vibration unit 54R are respectively rotated, and therefore the bias direction of the third optical axis 64c is changed. As a result, image blurring in the first direction (pitch direction) is corrected.

It should be noted that a length (a length from the connecting pin 69a to the connection hole 72a) La of the third arm 72 of the first link member 66 in the Y axis direction, a length (a length from the center of the main body arm 74 to the connecting pin 75a) Lb of the connecting arm 75 of the second link member 67 in the same direction, and a length Lc from the upper connection boss 59c of the barrel 59 to the bearing boss 59b are equal to each other. With such a configuration, the length La, which is a radius of rotation in the event that the anti-vibration units 54 are rotated by the first link member 66, and the lengths Lb and Lc, which are radii of rotations in the event that the first reflective members 60 are rotated by the second link member 67, are equal to each other. Therefore, in a state where the anti-vibration units 54 are rotated (inclined), rotation of the second link member 67 is possible.

Figure 13:
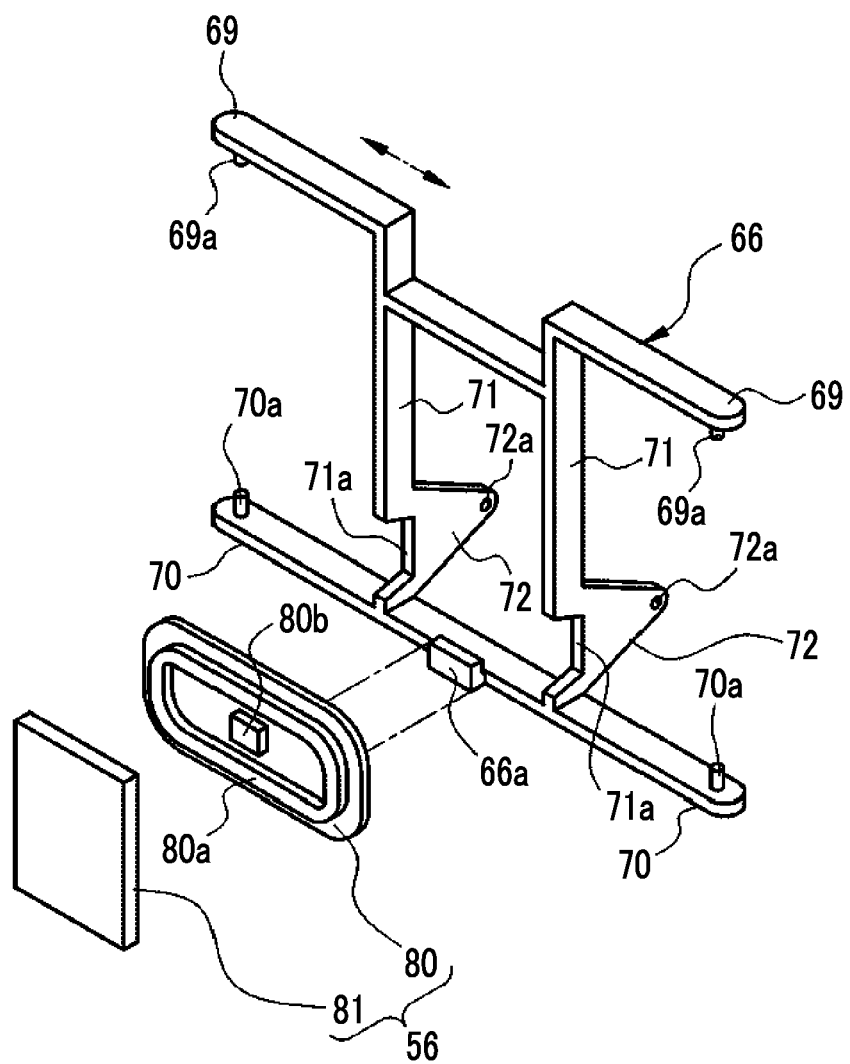
FIG. 13 is a perspective view of a first actuator.

As shown in FIG. 13, the first actuator 56 comprises a coil substrate 80 and a magnet 81. The coil substrate 80 is mounted on an attachment portion 66a of the first link member 66. The magnet 81 has a plate shape, and is fixed in the main body portion 31 so as to face the coil substrate 80. A coil 80a, around which a copper wire is wound, is provided on the coil substrate 80. The first actuator 56 is a so-called flat-coil-type voice coil motor, and drives the first link member 66 by applying current to the coil 80a and moving the coil substrate 80 in the X axis direction in magnetic field of the magnet 81.

An X-axis position sensor 80b is provided on the coil substrate 80. The X-axis position sensor 80b measures an amount of movement of the coil substrate 80 in the X axis direction inside the coil 80a. The X-axis position sensor 80b is, for example, a magnetic sensor such as a Hall element, detects magnetic field of the magnet 81, and outputs a detection signal according to an intensity of the magnetic field.

Figure 14:
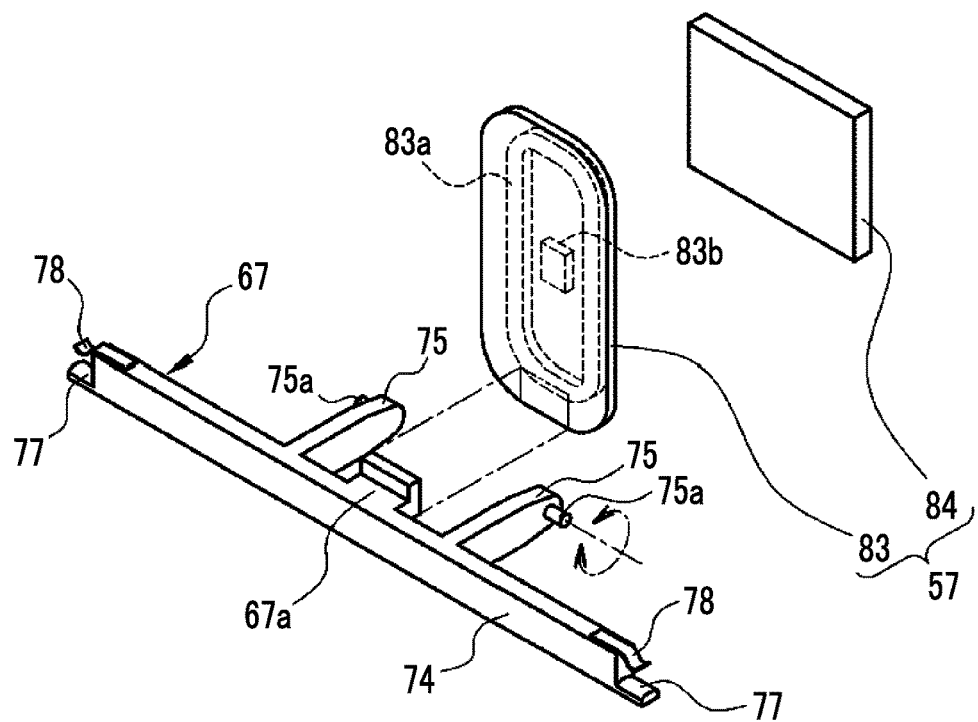
FIG. 14 is a perspective view of a second actuator.

As shown in FIG. 14, the second actuator 57 comprises a coil substrate 83 and a magnet 84. The coil substrate 83 is mounted on an attachment portion 67a of the second link member 67. The magnet 84 has a plate shape, and is fixed in the main body portion 31 so as to face the coil substrate 83. A coil 83a and a Z-axis position sensor 83b are provided on the coil substrate 83. The second actuator 57 is a voice coil motor which is the same as the first actuator 56, and drives the second link member 67 by applying current to the coil 83a and moving the coil substrate 83 in the Z axis direction in magnetic field of the magnet 84. The Z-axis position sensor 83b is a magnetic sensor which is the same as the X-axis position sensor 80b, and measures an amount of movement of the coil substrate 83 in the Z axis direction.

Figure 15:
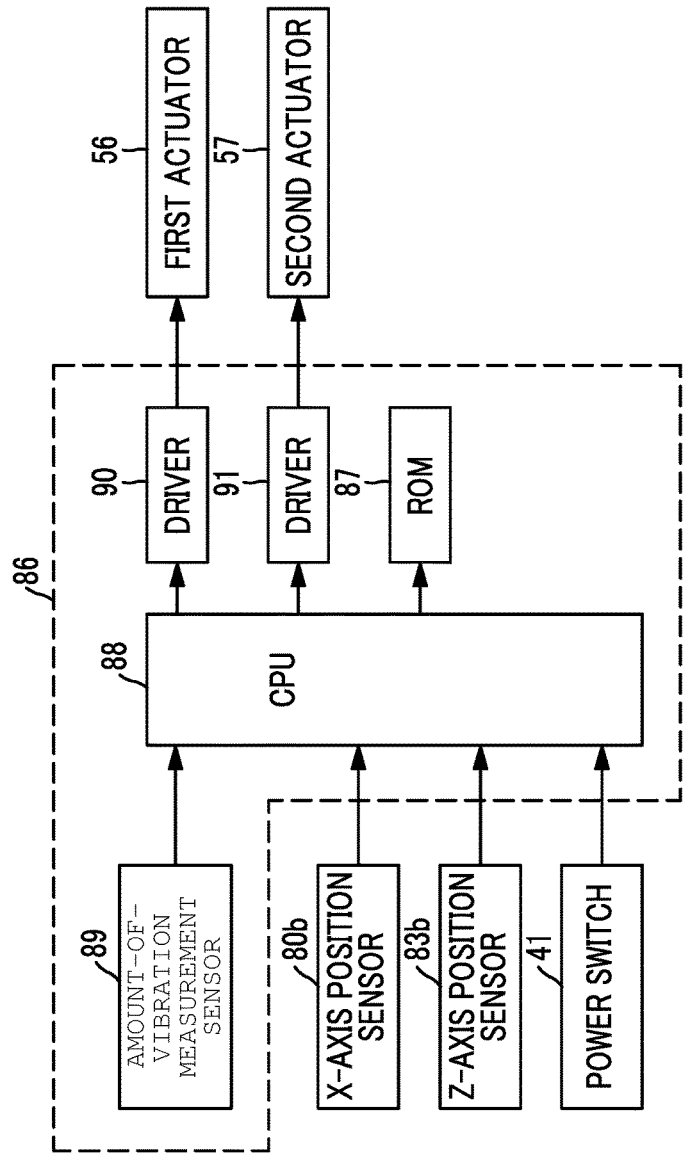
FIG. 15 is a block diagram of an anti-vibration control circuit.

As shown in FIG. 15, an anti-vibration control circuit 86 provided on the control substrate 46 comprises a read only memory (ROM) 87, a central processing unit (CPU) 88, an amount-of-vibration measurement sensor 89, and drivers 90 and 91. The ROM 87 stores a control program. The CPU 88 controls an anti-vibration mechanism 45 on the basis of the control program. The amount-of-vibration measurement sensor 89 measures amounts of vibration of the binocle 30 around the X and Z axes. The drivers 90 and 91 respectively drive the first actuator 56 and the second actuator 57. The CPU 88 is connected to the power switch 41, the X-axis position sensor 80b, and the Z-axis position sensor 83b.

Next, effects of the above-mentioned embodiment will be described. The anti-vibration control circuit 86 starts actuation through an ON operation of the power switch 41. The amount-of-vibration measurement sensor 89 detects vibration of the binocle 30 (binoculars) around the X and Z axes, and outputs the detection signal to the CPU 88. The CPU 88 controls the drivers 90 and 91 on the basis of the detection signal of the amount-of-vibration measurement sensor 89 and the position information of the coil substrate 80 and the coil substrate 83 detected by the X-axis position sensor 80b and the Z-axis position sensor 83b, and drives the first actuator 56 and the second actuator 57 so as to correct image blurring of an optical image.

In a case where image blurring in the pitch direction occurs in the binocle 30, the CPU 88 moves the coil substrate 83 of the second actuator 57 in the Z axis direction. The second link member 67 is rotated around the connecting pins 75a of the connecting arms 75 through movement of the coil substrate 83. The second reflective members 62 of the left anti-vibration unit 54L and the right anti-vibration unit 54R are respectively rotated around the X axes centered on the rotation pins 61a. Thereby, the bias direction of the third optical axis 64c is changed, and thus image blurring in the first direction (pitch direction) is corrected.

Further, in a case where image blurring in the yaw direction occurs in the binocle 30, the CPU 88 moves the coil substrate 80 of the first actuator 56 in the X axis direction. The first link member 66 is moved in the X axis direction through movement of the coil substrate 80, and the respective barrels 59 of the left anti-vibration unit 54L and the right anti-vibration unit 54R are respectively rotated around the Z axes centered on the bearing bosses 59b. Thereby, the respective first reflective members 60 and the respective second reflective members 62 of the left anti-vibration unit 54L and the right anti-vibration unit 54R are integrally rotated, and the bias direction of the third optical axis 64c is changed. Therefore, it is possible to correct image blurring in the second direction (yaw direction).

In a case where image blurring in the pitch direction and yaw direction occurs in the binocle 30, the CPU 88 integrally rotates the respective first reflective members 60 and the respective second reflective members 62 of the left anti-vibration unit 54L and the right anti-vibration unit 54R around the Z axes while rotating the respective first reflective members 60 and the respective second reflective members 62 of the left anti-vibration unit 54L and the right anti-vibration unit 54R around the X axes by driving the first actuator 56 and the second actuator 57. Even in such a case where mixed image blurring is corrected, the first reflective members 60 and the second reflective members 62 are integrally rotated. Therefore, an optical image is prevented from rotating around the optical axis.

According to the binocle 30 (binoculars) of the present embodiment, compared with a binocle having an anti-vibration optical system formed of a reflective member used in the related art, the number of reflective members can be reduced. Therefore, it is possible to achieve reduction in size and weight and low costs for the binocle. Further, even in a case where the number of reflective members is reduced, an optical image is prevented from rotating. Thus, it is possible to appropriately perform observation of a distant view.

In the first embodiment and the second embodiment, the first reflective member is inclined at an angle of 45° with respect to the first optical axis of the objective optical system, and the second optical axis is deflected at an angle of 90° with respect to the first optical axis. However, an angle formed between the first optical axis and the second optical axis may be smaller than or larger than 90°. Further, in a case where the first reflective member and the second reflective member are integrally rotated, the second optical axis is used as a rotational axis thereof, but is not limited to this. For example, the second optical axis may be freely selected assuming that the axis is an axis that passes through the intersection between the first optical axis and the reflective surface of the first reflective member and is included in a plane formed by the first optical axis and the second optical axis.

Further, in the second embodiment, the left anti-vibration unit 54L and the right anti-vibration unit 54R are linked through the link mechanism 55 and integrally rotated, but the left anti-vibration unit 54L and the right anti-vibration unit 54R may be respectively rotated by separate actuators. In a case where the left anti-vibration unit 54L and the right anti-vibration unit 54R are linked through the link mechanism 55, a mechanism for performing position adjustment between the left anti-vibration unit 54L and the right anti-vibration unit 54R is necessary, and a complicated adjustment work therefor is necessary. However, assuming that both are driven by separate actuators, it is possible to perform the position adjustment through only control of the actuators, and thus an adjustment work therefor is simple.

In the above-mentioned embodiment, a surface reflection mirror was used as the reflective member, but a prism of which the rear surface is reflective may be used as the reflective member. Further, the binocle (binoculars) is exemplified in the second embodiment, but the anti-vibration optical system, the telephoto optical system, and the anti-vibration unit of the present invention may be applied to a monocle. The pair of anti-vibration optical systems, the pair of telephoto optical systems, and the pair of anti-vibration units of the present invention each are provided as for left and right sides in a case where those are applied to the binocle. The single anti-vibration optical system, the single telephoto optical system, and the single anti-vibration unit are provided in a case where those are applied to a monocle. Furthermore, in the description of each embodiment, in order to show a positional relationship between a plurality of optical axes, a certain term such as a right angle or parallelism is used as a specific numerical angle such as 45° or 90°. However, those include tolerances according to accuracies required in an optical system.

The anti-vibration unit of the present invention can be applied to a photography apparatus such as a digital camera. The photography apparatus comprises a lens barrel and a camera main body. The lens barrel houses a photography optical system. The camera main body has an imaging sensor that captures an image of light emitted from the lens barrel. The imaging sensor is, for example, a complementary metal oxide semiconductor (CMOS) imaging sensor, a charge coupled device (CCD) imaging sensor, or the like. The anti-vibration unit is disposed between the lens barrel and the imaging sensor.

The anti-vibration unit is provided on either the lens barrel or the camera main body. For example, in an interchangeable-lens-type photography apparatus in which the lens barrel can be replaced, in a case where the anti-vibration unit is provided in the lens barrel, the lens barrel includes not only the anti-vibration unit, but also members (for example, a first actuator, a second actuator, an anti-vibration control circuit, and the like) for operating the anti-vibration unit.

Further, in a photography apparatus having an optical finder device, the anti-vibration unit may be provided in the optical finder device.

In addition, in a case where the anti-vibration unit is applied to a photography apparatus, the first reflective member is disposed to be inclined with respect to an incidence optical axis (first optical axis) of the photography optical system.

EXPLANATION OF REFERENCES 10 anti-vibration optical system
11 telephoto optical system
12 objective optical system
13 ocular optical system
14a, 64a first optical axis
14b, 64b second optical axis
14c, 64c third optical axis
15, 60 first reflective member
15a reflective surface
16, 62 second reflective member
16a reflective surface
18, 19 rotational axis
30 binocle (binoculars)
37L left telephoto optical system
37R right telephoto optical system
54L left anti-vibration unit
54R right anti-vibration unit
55 link mechanism
59 barrel
61 holding plate

What is claimed is:

1. An anti-vibration optical system that is disposed between an objective optical system and an ocular optical system constituting a telephoto optical system so as to prevent image blurring of an optical image from being caused by vibration of the telephoto optical system, the anti-vibration optical system comprising:
   a first reflective member that is disposed to be inclined with respect to a first optical axis of the objective optical system and sets a second optical axis by deflecting the first optical axis; and
   a second reflective member that is disposed to be inclined with respect to the second optical axis and sets a third optical axis, which is parallel to the first optical axis, by deflecting the second optical axis,
   wherein either one of the first reflective member or the second reflective member is used as a movable reflective member which is rotatable, image blurring in a first direction is corrected by rotating the movable reflective member, and image blurring in a second direction orthogonal to the first direction is corrected by integrally rotating the first reflective member and the second reflective member, and
   wherein a second rotary shaft, around which the first reflective member and the second reflective member are integrally rotated in order to correct image blurring in the second direction, is on the second optical axis.

2. The anti-vibration optical system according to claim 1, wherein a first rotary shaft, around which the movable reflective member is rotated in order to correct image blurring in the first direction, is a shaft that passes through an intersection between the second optical axis and a reflective surface of the movable reflective member and that is perpendicular to a plane formed by the first optical axis and the second optical axis.

3. The anti-vibration optical system according to claim 1, further comprising a barrel that rotatably holds one reflective member of either the first reflective member or the second reflective member, which is used as the movable reflective member, so as to be able to correct image blurring in the first direction, and that holds the other reflective member in a stationary state.

4. The anti-vibration optical system according to claim 3, wherein the barrel is held rotatably so as to be able to correct image blurring in the second direction.

5. The anti-vibration optical system according to claim 1, wherein an angle formed between the first optical axis and the second optical axis is a right angle.

6. A telephoto optical system comprising:
   an objective optical system having a positive composite focal length;
   an ocular optical system; and
   the anti-vibration optical system according to claim 1 that is provided between the objective optical system and the ocular optical system.

7. The telephoto optical system according to claim 6, wherein the ocular optical system has a positive composite focal length, and an erecting optical system, which inverts an optical image in vertical and horizontal directions, is provided between the anti-vibration optical system and the ocular optical system.

8. A binocle capable of allowing binocular vision comprising a left telephoto optical system and a right telephoto optical system as a pair of telephoto optical systems according to claim 7 which are arranged on the left and right sides thereof such that the first optical axes thereof are parallel to each other, wherein the left telephoto optical system and the right telephoto optical system are respectively provided with anti-vibration optical systems which are separate.

9. The binocle according to claim 8, wherein the anti-vibration optical system of the left telephoto optical system and the anti-vibration optical system of the right telephoto optical system are connected through a link mechanism such that an amount of rotation for correcting image blurring in the first direction is equal to an amount of rotation for correcting image blurring in the second direction.

10. An anti-vibration unit that prevents image blurring of an optical image from occurring, the anti-vibration unit comprising:
   a first reflective member that is disposed to be inclined with respect to a first optical axis and sets a second optical axis by deflecting the first optical axis;
   a second reflective member that is disposed to be inclined with respect to the second optical axis and sets a third optical axis, which is parallel to the first optical axis, by deflecting the second optical axis; and
   a holding member that is disposed to be rotatable around the second optical axis while holding the first reflective member and the second reflective member, holds one of the first reflective member and the second reflective member in a stationary state, and holds the other thereof rotatably around an axis perpendicular to a plane formed by the first optical axis and the second optical axis, and
   wherein a second rotary shaft, around which the first reflective member and the second reflective member are integrally rotated in order to correct image blurring in the second direction, is on the second optical axis.

\* \* \* \* \*